United States Patent
Furukawa et al.

(10) Patent No.: US 9,350,223 B2
(45) Date of Patent: May 24, 2016

(54) POWER GENERATOR HAVING COIL AND MAGNET DISPOSED BETWEEN PAIR OF LEAF SPRINGS

(71) Applicant: Mitsumi Electric Co., Ltd., Tama-shi, Tokyo (JP)

(72) Inventors: Kenichi Furukawa, Sagamihara (JP); Kensuke Yamada, Tachikawa (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 330 days.

(21) Appl. No.: 14/044,061

(22) Filed: Oct. 2, 2013

(65) Prior Publication Data
US 2014/0103751 A1    Apr. 17, 2014

(30) Foreign Application Priority Data
Oct. 11, 2012   (JP) .................................. 2012-226300

(51) Int. Cl.
*H02K 35/02*   (2006.01)
*H02K 33/02*   (2006.01)

(52) U.S. Cl.
CPC ...................................... *H02K 35/02* (2013.01)

(58) Field of Classification Search
CPC ....... H02K 35/00; H02K 35/02; H02K 33/02; H02K 33/10
USPC ................................ 310/25, 29, 21, 32, 12.16
See application file for complete search history.

(56) References Cited

U.S. PATENT DOCUMENTS

| 3,956,895 | A | 5/1976 | Noble et al. | |
| 5,647,217 | A | 7/1997 | Penswick et al. | |
| 7,569,952 | B1 * | 8/2009 | Bono | H02K 35/02 310/15 |
| 2010/0327672 | A1 * | 12/2010 | Roberts | H02K 35/00 310/25 |

FOREIGN PATENT DOCUMENTS

JP   2011-160548   8/2011

* cited by examiner

*Primary Examiner* — Michael Andrews
(74) *Attorney, Agent, or Firm* — Marger Johnson

(57) ABSTRACT

A power generator 100 includes a housing 20 and a power generating unit 10 disposed in the housing 20. The power generating unit 10 is constituted of a magnet assembly 30 having a permanent magnet 31, a coil 40 disposed so as to surround the permanent magnet 31, a coil holding portion 50 holding the coil 40 and a pair of an upper leaf spring 60U and a lower leaf spring 60L disposed in the housing 20 so as to be opposed to each other through at least one of the magnet assembly 30, the coil 40 and the coil holding portion 50.

9 Claims, 10 Drawing Sheets

POWER GENERATOR HAVING COIL AND MAGNET DISPOSED BETWEEN PAIR OF LEAF SPRINGS

RELATED APPLICATION DATA

This application claims priority to Japanese Patent Application No. 2012-226300, filed Oct. 11, 2012, herein incorporated by reference.

BACKGROUND OF THE INVENTION

1. Field of the Invention

The present invention relates to a power generator.

2. Description of the Prior Art

Recently, various power generators generating electric power by converting vibration energy into electric energy are developed. For example, see a patent document 1 (JP 2011-160548A).

The patent document 1 discloses a power generator as shown in FIG. 15. The power generator includes a main body 200 having a rectangular parallelepiped shape formed by a top plate 240 in which an upper through-hole 280 is formed, a bottom plate 260 in which a lower through-hole 400 is formed and sidewalls 220A, 220B. The power generator further includes an upper coil spring 360 provided on an inner-upper side of the main body 200, a lower coil spring 360 provided on an inner-lower side of the main body 200, an upper steel rod 160 passing through the upper through-hole 280 and coupled with the inner-upper side of the main body 200 through the upper coil spring 360, and a lower steel rod 180 passing through the lower through-hole 400 and coupled with the inner-lower side of the main body 200 through the lower coil spring 360.

An upper end portion of the upper steel rod 160 is fixed to a base and a lower end portion of the lower steel rod 180 is attached to a vibrating body such as an air-conditioning duct. Thus, the main body 200 can be vibrated in an axial direction of the steel rods 160, 180 when the vibrating body is vibrated.

The main body 200 contains a power generating unit 460 having a weight 420 fixed on an inner surface of the main body 200, a magnet 480 supported on the weight 420 in the axial direction of the steel rods 160, 180 through a coil spring 520 provided on the weight 420 and a coil 500 fixed on the inner surface of the main body 200. In such power generating unit 460, the magnet 480 is vibrated in the main body 200 along with a vibration of the main body 200. This makes it possible to displace the coil 500 relative to the magnet 480, thereby generating a voltage in the coil 500 due to the electromagnetic induction.

In such power generator having the above structure, the steel rods 160, 180 act as a guide for a vibration of the magnet 480 while the magnet 480 is displaced in a vertical direction. This makes it possible to convert the vibration of the vibrating body into the vibration of the magnet 480 (the main body 200) in the vertical direction. As a result, the power generating unit 460 can generate electric power.

However, in such power generator having the above structure, the main body 200 is likely to be vibrated not only in the vertical direction but also in other directions. As a result, there is a case where the steel rods 160, 180 are slid (vibrated in a horizontal direction) and respectively contact with the through-hole 280, 400. Such contact decreases transmission efficiency of the vibration from the vibrating body to the main body 200 and results in decreasing power generation efficiency of the power generator.

In addition, in such power generator having the above structure, a height (vertical size) of the main body 200 becomes relatively large. Thus, there is a problem that it is necessary to ensure a large installation space for installing the power generator.

SUMMARY OF THE INVENTION

The present invention has been made in view of the problems mentioned above. Accordingly, it is an object of the present invention to provide a power generator which can effectively generate electric power in a broad frequency range by improving transmission efficiency of vibration from an external vibrating system to two vibrating systems in the power generator and can be installed in a small space.

In order to achieve the object, the present invention is directed to a power generator which includes a housing; a magnet disposed in the housing in a state that the magnet can be displaced in a magnetization direction thereof; a coil disposed in the housing so as to surround the magnet without contacting with the magnet; a coil holding portion disposed between the magnet and the housing, the coil holding portion holding the coil in a state that the coil can be displaced relative to the magnet in the magnetization direction of the magnet; and a pair of leaf springs disposed in the housing so as to be opposed to each other through at least the magnet, the coil and the coil holding portion. In this power generator, each of the leaf springs has first spring portions coupling the housing with the coil holding portion and second spring portions coupling the coil holding portion with the magnet.

In the power generator according to the present invention, it is preferred that each of the leaf springs includes a first circular portion; a second circular portion arranged at an inner side of the first circular portion concentrically with the first circular portion and coupled with the first circular portion through the first spring portions; and a third circular portion arranged at an inner side of the second circular portion concentrically with the second circular portion and coupled with the second circular portion through the second spring portions, and the housing holds the first circular portions of the leaf springs, the coil holding portion is supported between the second circular portions of the leaf springs, and the magnet is supported between the third circular portions of the leaf springs.

In the power generator according to the present invention, it is preferred that each of the first spring portions of the leaf springs has an arch-shaped portion extending along with a circumferential direction of the first circular portion and the second circular portion so as to couple the first circular portion with the second circular portion.

In the power generator according to the present invention, it is preferred that each of the second spring portions of the leaf springs has an arch-shaped portion extending along with a circumferential direction of the second circular portion and the third circular portion so as to couple the second circular portion with the third circular portion.

In the power generator according to the present invention, it is preferred that each of the leaf springs has a rotationally symmetrical shape around a central axis thereof.

In the power generator according to the present invention, it is preferred that the number of the first spring portions is different from the number of the second spring portions.

In the power generator according to the present invention, it is preferred that at least one selected from the group consisting of a thickness, a constitutional material, the number of the first spring portions and the number of the second spring portions of one of the leaf springs is different from the one of the other of the leaf springs.

In the power generator according to the present invention, it is preferred that a clearance between the first spring portions of one of the leaf springs and the first spring portions of the other of the leaf springs varies from one side close to the housing to another side close to the coil holding portion.

In the power generator according to the present invention, it is preferred that a clearance between the second spring portions of one of the leaf springs and the second spring portions of the other of the leaf springs varies from one side close to the coil holding portion to another side close to the magnet.

In the power generator according to the present invention, it is preferred that the leaf springs have a shape identical to each other, and the leaf springs are arranged so as not to completely overlap the first spring portions of one of the leaf springs with the first spring portions of the other of the leaf springs and/or the second spring portions of one of the leaf springs with the second spring portions of the other of the leaf springs in a planar view of the power generator.

Effect of the Invention

The power generator according to the present invention includes the pair of leaf springs disposed in the housing so as to be opposed to each other through at least the magnet, the coil and the coil holding portion. Each of the magnet and the coil holding portion is supported between the leaf springs (coupled with the leaf springs). Each of the leaf springs has the plurality of first spring portions coupling the housing with the coil holding portion and the plurality of second spring portions coupling the coil holding portion with the magnets.

Such leaf spring having the above structure has a longitudinal stiffness in a thickness direction thereof and a lateral stiffness in a lateral direction perpendicular to the thickness direction. The lateral stiffness is larger than the longitudinal stiffness. Thus, each of the leaf springs is more likely to be distorted or deformed in the thickness direction than the lateral direction. Further, since each of the magnet and the coil holding portion holding the coil is supported between the pair of leaf springs (coupled with the pair of leaf springs), each of the magnet and the holding portion holding the coil is vibrated together with the leaf springs.

Therefore, in the power generator according to the present invention, it is possible to prevent the magnet and the coil holding portion holding the coil from being vibrated in the lateral direction perpendicular to the thickness direction of the leaf springs (lateral motion) and being rotated (rolling motion). This makes it possible to restrict a vibrational axis of the magnet and the coil holding portion to a specific direction (the thickness direction of the leaf springs). As a result, it is possible to prevent the magnet and the coil holding portion holding the coil from contacting with each other while each of the magnet and the coil holding portion holding the coil is vibrated (that is, at the time of generating electric power).

Further, the power generator according to the present invention includes a vibrating system having two degrees of freedom (hereinafter, referred to as "a two degrees of freedom vibrating system", which comprises a first vibrating system in which the coil holding portion holding the coil and coupled with the housing through the first spring portions of the leaf springs is vibrated relative to the housing and a second vibrating system in which the magnet coupled with the coil holding portion through the second spring portions of the leaf springs is vibrated relative to the coil holding portion holding the coil.

In addition, as mentioned above, the contact between the magnet and the coil holding portion is avoided while each of the magnet and the coil holding portion is vibrated. Therefore, it is possible to efficiently transmit vibrational energy of a vibrating body to the first vibrating system and then efficiently transmit vibrational energy of the first vibrating system to the second vibrating system. Namely, the vibrational energy is transmitted from the vibrating body to the first vibrating system and then transmitted to the second vibrating system through the first vibrating system. As a result, the power generator can generate electric power with high efficiency.

In addition, the first vibrating system has the coil, a mass of the coil holding portion, a spring constant of the first spring portions and a first resonant frequency due to a mass ratio of the first vibrating system to the second vibrating system. On the other hand, the second vibrating system has a mass of the magnet, a spring constant of the second spring portions and a second resonant frequency due to the mass ratio of the first vibrating system to the second vibrating system. By appropriately setting the first and the second resonant frequencies, it is possible to amplify the external vibration in a frequency range between the first and the second resonant frequencies.

For the reasons explained above, even in a case where the external vibration has a frequency other than the first and the second resonant frequencies, the power generator according to the present invention can efficiently convert the external vibration into electric power. In other words, by setting masses of components and the spring constants of the spring portions of the leaf springs according to the frequency of the external vibration of the vibrating body, it is possible to efficiently convert the external vibration into electric energy in a broad frequency range.

In addition, in the power generator according to the present invention, the second vibrating system is disposed at an inner side of the first vibrating system. This makes it possible to reduce a height of the power generator and install the power generator in a smaller space.

DETAILED DESCRIPTION OF THE PREFERRED EMBODIMENTS

Hereinafter, power generators according to a first embodiment to a fourth embodiment of the present invention will be described below with reference to the accompanying drawings.

First Embodiment

Description will be first given to a power generator 100 according to a first embodiment of the present invention.

Figure 1:
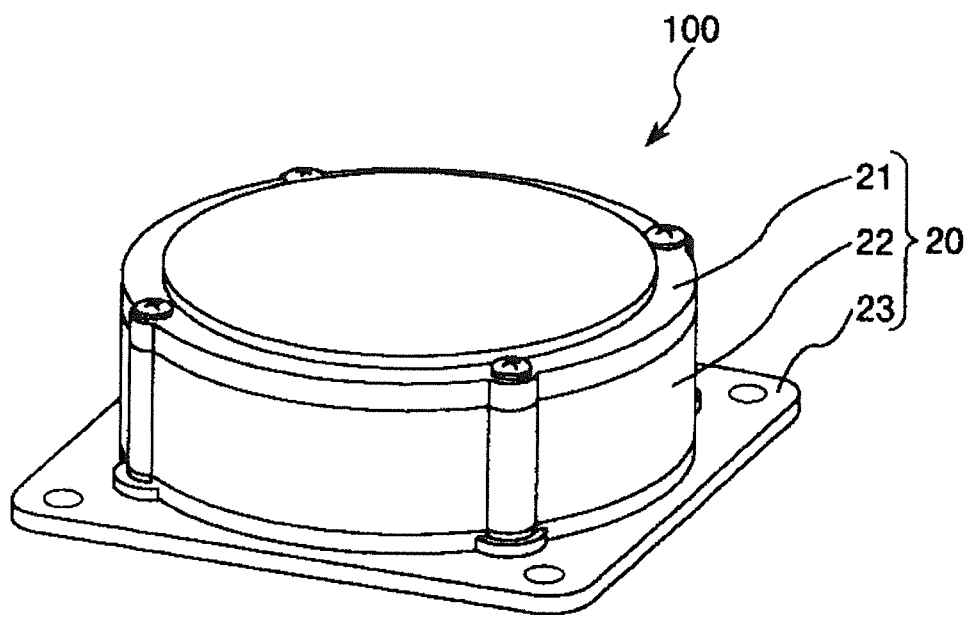
FIG. 1 is a perspective view showing a power generator according to a first embodiment of the present invention.
Figure 2:
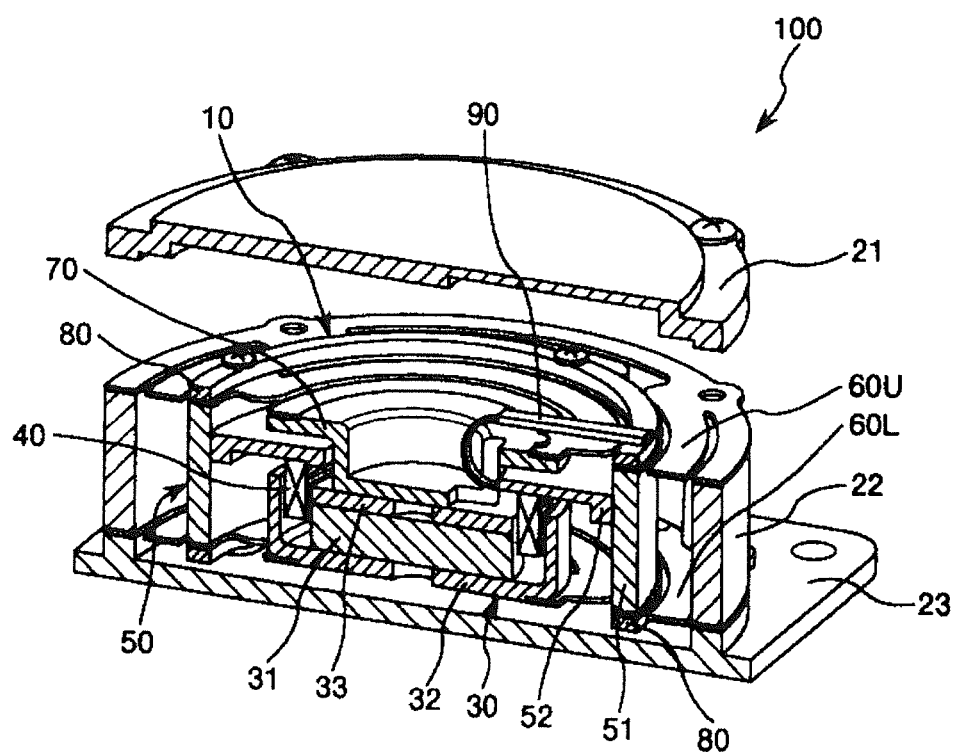
FIG. 2 is a cross-sectional perspective view showing the power generator shown in FIG. 1.
Figure 3:
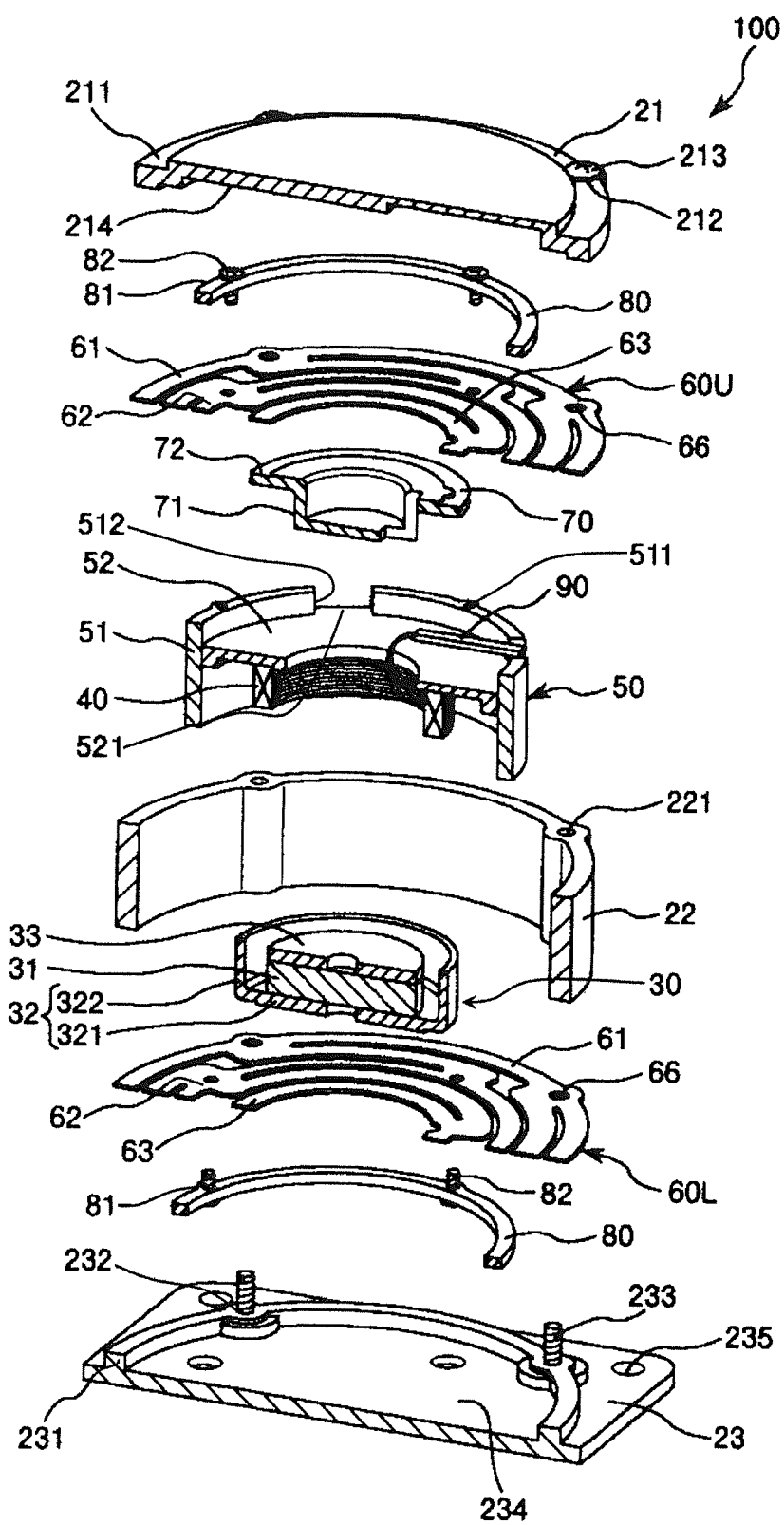
FIG. 3 is an exploded perspective view showing the power generator shown in FIG. 2.

FIG. 1 is a perspective view showing the power generator 100 according to the first embodiment of the present invention. FIG. 2 is a cross-sectional perspective view showing the power generator 100 shown in FIG. 1. FIG. 3 is an exploded perspective view showing the power generator 100 shown in FIG. 2.

Hereinafter, an upper side in each of FIGS. 1 to 3 is referred to as "upper" or "upper side" and a lower side in each of FIGS. 1 to 3 is referred to as "lower" or "lower side".

As shown in FIGS. 1 to 3, the power generator 100 includes a housing 20 and a power generating unit 10 disposed in the housing 20 in a state that the power generating unit 10 can be vibrated in a vertical direction in FIG. 2. The power generating unit 10 has a pair of an upper leaf spring 60U and a lower leaf spring 60L opposed to the upper leaf spring 60U, a magnet assembly 30 supported between the pair of leaf springs 60U, 60L and having a permanent magnet 31, a coil 40 disposed so as to surround the permanent magnet 31 and a coil holding portion 50 holding the coil 40. In this embodiment, the upper leaf spring 60U and the lower leaf spring 60L have a shape substantially identical to each other.

Hereinafter, description will be given to a structure of each component.

<<Housing 20>>

As shown in FIG. 3, the housing 20 has a cover 21, a base 23 and a cylindrical portion 22 disposed between the cover 21 and the base 23.

The cover 21 is formed into a roughly discoid shape which includes a circular portion and an annular lib (a ring-shaped lib) 211 integrally formed around a periphery of the circular portion so as to downwardly protrude from the periphery of the circular portion. Four through-holes 212 are formed in the lib 211 at regular intervals. Further, a concave portion (runoff) 214 is defined by the cover 21 at an inner side of the lib 211 so as to downwardly open. Since the power generating unit 10 can be displaced (retracted) in the concave portion 214 at the time of vibration, it is possible to prevent the power generating unit 10 from contacting with the cover 21 (circular portion).

The cylindrical portion 22 has a cylindrical shape, and a size thereof in the planar view is substantially equal to a size of the lib 211 of the cover 21 in the planar view. When the power generating unit 10 is assembled in the housing 20 (hereinafter, this state is referred to as "assembled state"), a main part of the power generating unit 10 which contributes to power generation is disposed in the cylindrical portion 22.

Four threaded holes 221 are formed on an upper end of the cylindrical portion 22 so as to respectively correspond to the through-holes 212. In addition, through-holes 66 are formed on a peripheral portion of each of the upper leaf spring 60U and the lower leaf spring 60L (that is, first circular portions 61 of the leaf springs 60U, 60L which will be explained below) so as to respectively correspond to the above mentioned four through-holes 212 and the threaded holes 221. The peripheral portion of the upper leaf spring 60U is disposed between the cover 21 and the cylindrical portion 22, and then screws 213 are screwed into the threaded holes 221 of the cylindrical portion 22 passing through the through-holes 212 of the cover 21 and the through-holes 66 of the upper leaf spring 60U. This makes it possible to fixedly hold the peripheral portion of the upper leaf spring 60U between the cover 21 and the cylindrical portion 22, that is, the power generating unit 10 is coupled with the cover 21 and the cylindrical portion 22.

The base 23 has a rectangular plate-like shape, and an annular lib (a ring-shaped lib) 231 is integrally formed on a center part of the upper surface of the base 23 so as to upwardly protrude from the base 23. In other words, a concave portion (space) 234 is defined by the base 23 at an inner side of the lib 231. Since the power generating unit 10 can be displaced (retracted) in the concave portion 234 at the time of vibration, it is possible to prevent the power generating unit 10 from contacting with the base 23.

In the base 23, four through-holes 232 are formed in the lib 231 at regular intervals. In addition, four threaded holes 221 are formed on a lower end of the cylindrical portion 22 so as to respectively correspond to the through-holes 232. The peripheral portion of the lower leaf spring 60L (that is, the first circular portion 61) is disposed between the base 23 (lib 231) and the cylindrical portion 22, and then screws 233 are screwed into the threaded holes 221 of the cylindrical portion 22 passing through the through-holes 232 of the base 23 and the through-holes 66 of the lower leaf spring 60L. This makes it possible to fixedly hold the peripheral portion of the lower leaf spring 60L between the base 23 and the cylindrical portion 22, that is, the power generating unit 10 is coupled with the base 23 and the cylindrical portion 22.

Four through-holes 235 are respectively formed in four corners of the base 23. By screwing screws (not shown) into threaded holes formed on the vibrating body passing through the through-holes 235, the base 23 is fixedly attached to the vibrating body. Namely, the power generator 100 is fixedly attached to the vibrating body. In addition, through-holes are formed in a part of the base 23 defining the concave portion 234 so as to respectively receive heads of screws 82 for screwing the screws 82 into threaded holes 81 of a washer 80 (which will be explained below) in the assembled state.

Examples of the vibrating body include an air-conditioning duct, a transportation (such as a freight train, an automobile and a back of truck), a crosstie for railroad, an express highway, a tunnel, a bridge, a vibrating device such as a pump and a turbine, and a pipe for sending oil pressure or air pressure.

A constituent material of the housing 20 (the cover 21, the cylindrical portion 22 and the base 23) is not limited to a specific material, but examples of the constituent material include a metallic material, a ceramic material, a resin material and a combination of two or more the above materials.

A width of the housing 20 (the base 23) is not limited to a specific value, but preferably in the range of about 60 to 120 mm from the view point of downsizing the power generator 100. An average height of the housing 20 is not limited to a specific value, but preferably in the range of about 20 to 50 mm, and more preferably in the range of about 30 to 40 mm from the viewpoint of reducing the height of the power generator 100. The power generating unit 10 is supported in the housing 20 through the upper and lower leaf springs 60U, 60L in a state that the power generating unit 10 can be vibrated.

Next, description will be given to each component constituting the power generator 100.

<<Upper Leaf Spring 60U and Lower Leaf Spring 60L>>

The upper leaf spring 60U is disposed between the cover 21 and the cylindrical portion 22. The lower leaf spring 60L is disposed between the base 23 and the cylindrical portion 22.

Figure 4:
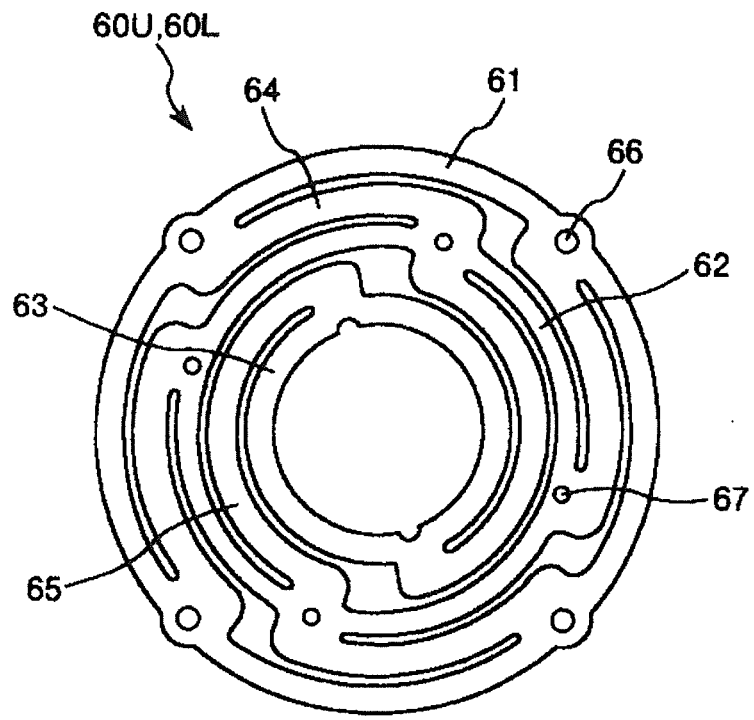
FIG. 4 is a planar view showing a leaf spring included in the power generator shown in FIG. 1.

FIG. 4 is a planar view showing the leaf spring (the upper leaf spring 60U or the lower leaf spring 60L) included in the power generator 100 shown in FIG. 1. Hereinafter, description will be given to the leaf springs 60U, 60L with reference to FIG. 4.

Each of the leaf springs 60U, 60L is a circular component formed of a metallic-thin plate. Each of the leaf springs 60U, 60L has the first circular portion 61 having a first internal diameter, a second circular portion 62 having a second internal diameter smaller than the first inner diameter of the first circular portion 61 and a third circular portion 63 having a third internal diameter smaller than the second inner diameter of the second circular portion 62. In each of the leaf springs 60U, 60L, the first circular portion 61, the second circular portion 62 and the third circular portion 63 are arranged from the outside to the inside thereof in this order. Further, the first circular portion 61, the second circular portion 62 and the third circular portion 63 are arranged concentrically with each other in each of the leaf springs 60U, 60L. The first circular portion 61 is coupled with the second circular portion 62 through a plurality of first spring portions 64 (in this embodiment, the number of the first spring portions 64 is four). The second circular portion 62 is coupled with the third circular portion 63 through a plurality of second spring portions 65 (in this embodiment, the number of the second spring portion 65 is two).

The four through-holes 66 are formed in the first circular portion 61 of each of the leaf springs 60U, 60L along with a circumferential direction of the first circular portion 61 at regular intervals (at regular angular-intervals of about 90 degree). By screwing the screws 213 into the threaded holes 221 formed on the upper end of the cylindrical portion 22 passing through the through-holes 66 of the upper leaf spring 60U and the through-holes 212 of the cover 21, it is possible to fixedly holed the first circular portion 61 of the upper leaf spring 60U between the cover 21 and the cylindrical portion 22. In the same manner, by screwing the screws 233 into the threaded holes 221 formed on the lower end of the cylindrical portion 22 passing through the through-holes 66 of the lower leaf spring 60L and the through-holes 232 of the base 23, it is possible to fixedly hold the first circular portion 61 of the lower leaf spring 60L between the base 23 and the cylindrical portion 22.

Further, four through-holes 67 are formed in the second circular portion 62 of each of the leaf springs 60U, 60L along with a circumferential direction of the second circular portion 62 at regular intervals (at regular angular-intervals of about 90 degree). Furthermore, four threaded holes 511 are formed respectively on both an upper end and a lower end of the coil holding portion 50 (a cylindrical portion 51 which will be explained below) so as to correspond to the through-holes 67 formed in the second circular portion 62 of each of the leaf springs 60U, 60L. Two circular washers 80 (an upper washer 80 and a lower washer 80) are respectively disposed on an upper side of the upper leaf springs 60U and a lower side of the lower leaf springs 60L. Four through-holes 81 are formed in each of the washers 80 so as to correspond to the through-holes 67 formed in the second circular portion 62 of each of the leaf springs 60U, 60L and the threaded holes 511 of the coil holding portion 50.

The upper leaf spring 60U is disposed between the upper washer 80 placed on the upper surface of the upper leaf spring 60U and the coil holding portion 50, and then the screws 82 are screwed into the threaded holes 511 formed on the upper end of the coil holding portion 50 passing through the through-holes 81 of the upper washer 80 and the through-holes 67 of the second circular portion 62 of the upper leaf spring 60U. This makes it possible to couple the second circular portion 62 of the upper leaf spring 60U with the upper end of the cylindrical portion 51 of the coil holding portion 50. In the same manner, the lower leaf spring 60L is disposed between the lower washer 80 placed on the lower surface of the lower leaf spring 60L and the coil holding portion 50, and then the other screws 82 are screwed into the threaded holes 511 formed on the lower end of the coil holding portion 50 passing through the through-holes 81 of the lower washer 80 and the through-holes 67 of the second circular portion 62 of the lower leaf spring 60L. This makes it possible to couple the second circular portion 62 of the lower leaf spring 60L with the lower end of the cylindrical portion 51 of the coil holding portion 50. Each of the washers 80 has a size in the planar view substantially equal to a size of the second circular portion 62 in the planar view.

The third circular portion 63 of the upper leaf spring 60U is coupled with an upper side of a spacer 70 disposed on the magnet assembly 30 (which is explained below). The third circular portion 63 of the lower leaf spring 60L is coupled with a lower end of the magnet assembly 30. These components maybe coupled with each other by using an adhesive or the like.

Each of the four first spring portions 64 in the leaf springs 60U, 60L has an arch-shaped portion (a substantially sigmoidal shape). Each of the first spring portions 64 is arranged in a space between the first circular portion 61 and the second circular portion 62 so as to constitute two pairs. The two first spring portions 64 constituting one of the two pairs are arranged so as to be opposed to each other through the coil holding portion 50. Each of the first spring portions 64 has one end coupled with the first circular portion 61 at the vicinity of the through-hole 66 of the first circular portion 61, the arch-shaped portion extending along with an inner periphery of the first circular portion 61 and an outer periphery of the second circular portion 62 in the clockwise direction, and another end coupled with the second circular portion 62 at the vicinity of the through-hole 67.

The four first spring portions 64 in each of the leaf springs 60U, 60L couple the second circular portion 62 with the first circular portion 61 in a state that the second circular portion 62 can be vibrated relative to the first circular portion 61 in the vertical direction. As mentioned above, each of the first circular portions 61 is fixedly held by the housing 20 (between the cover 21 and the cylindrical portion 22 or between the cylindrical portion 22 and the base 23). Further, each of the second circular portions 62 is coupled with the coil holding portion 50. Therefore, the coil holding portion 50 coupled with the housing 20 through the first spring portions 64 can be vibrated relative to the housing 20 in the vertical direction when the external vibration of the vibrating body is transmitted to the housing 20.

Each of the two second spring portions 65 in each of the leaf springs 60U, 60L has an arch-shaped portion (a substantially sigmoidal shape). Each of the second spring portions 65 is arranged in a space between the second circular portion 62 and the third circular portion 63 so as to constitute one pair. Each of the second spring portions 65 is arranged so as to be opposed to each other through the magnet assembly 30. Each of the second spring portions 65 has one end coupled with the second circular portion 62 at the vicinity of the through-hole 67, the arch-shaped portion extending along with an inner periphery of the second circular portion 62 and an outer periphery of the third circular portion 63 in the clockwise direction, and another end coupled with the third circular portion 63. The two through-holes 67 positioned in the vicinity of the coupling points between the second spring portions 65 and the third circular portion 63 are arranged so as to be opposed to each other through the magnet assembly 30.

The two second spring portions 65 in each of the leaf springs 60U, 60L couple the third circular portion 63 with the second circular portion 62 in a state that the third circular portion 63 can be vibrated relative to the second circular portion 62 in the vertical direction. As mentioned above, each of the second circular portions 62 is coupled with the coil holding portion 50. Further, the third circular portion 63 of the upper leaf spring 60U is coupled with the magnet assembly 30 through the spacer 70. Furthermore, the third circular portion 63 of the lower leaf spring 60L is directly coupled with the magnet assembly 30. Therefore, the magnet assembly 30 coupled with the coil holding portion 50 through the second spring portions 65 can be vibrated relative to the coil holding portion 50 in the vertical direction.

As shown in FIG. 4, each of the leaf springs 60U, 60L explained above has a rotationally symmetrical shape around a central axis thereof (a central axis of the third circular portion 63). This makes it possible to prevent variation in spring constants of the first spring portions 64 and the second spring portions 65 arranged along with the circumferential direction. As a result, it is possible to enhance a lateral stiffness of each of the leaf springs 60U, 60L as a whole. In addition, it is possible to make an assembly work of the power generator 100 easier.

The power generator 100 having the above structure includes a first vibrating system in which the coil holding portion 50 coupled with the housing 20 through the first spring portions 64 of the leaf springs 60U, 60L is vibrated relative to the housing 20 and a second vibrating system in which the magnet assembly 30 coupled with the coil holding portion 50 through the second spring portions 65 of the leaf springs 60U, 60L is vibrated relative to the coil holding portion 50. In other words, in the power generator 100, the power generating unit 10 includes a two degrees of freedom vibrating system constituted of the first vibrating system and the second vibrating system.

Figure 5:
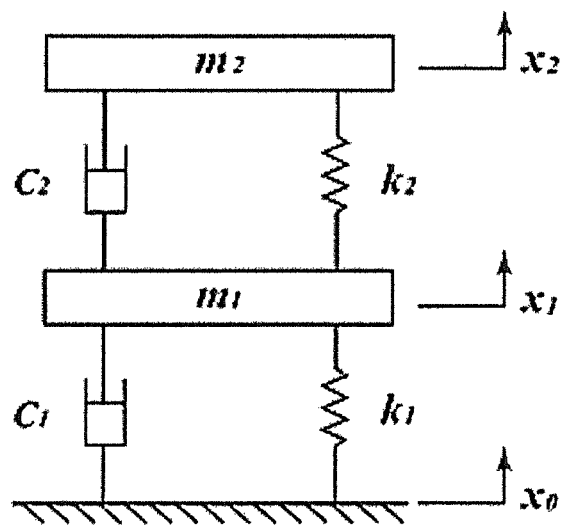
FIG. 5 is a model diagram for explaining a scheme of a two degrees of freedom vibrating system (a first vibrating system and a second vibrating system) included in the power generator shown in FIG. 1.
Figure 6:
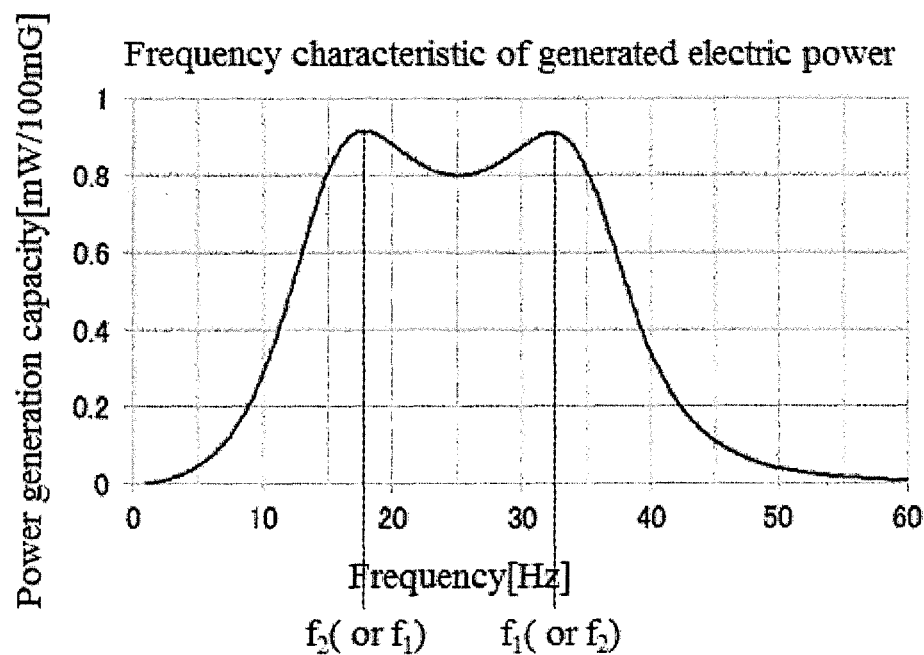
FIG. 6 is a graph for explaining a frequency characteristic of electric power generated by the two degrees of freedom vibrating system shown in FIG. 5.

Next, description will be given to the two degrees of freedom vibrating system with reference to the accompanying drawings. FIG. 5 is a model diagram for explaining a scheme of the two degrees of freedom vibrating system (the first vibrating system and the second vibrating system) included in the power generating unit 10. FIG. 6 is a graph for explaining a frequency characteristic of electric power generated by the two degrees of freedom vibrating system shown in FIG. 5.

In the power generating unit 10 having such two degrees of freedom vibrating system, the first vibrating system has a first natural frequency $\omega_1$ determined by a mass $m_1$ of the coil holding portion 50 (the coil 40 and the coil holding portion 50), a mass ratio $\mu$ between the coil holding portion 50 and the magnet assembly 30 and a spring constant $k_1$ of the first spring portions 64. On the other hand, the second vibrating system has a second natural frequency $\omega_2$ determined by a mass $m_2$ of the magnet assembly 30, the mass ratio $\mu$ between the coil holding portion 50 and the magnet assembly 30 and a spring constant $k_2$ of the second spring portions 65.

In more details, the natural frequencies $\omega_1$ and $\omega_2$ can be expressed by the following motion equation (1) according to the model diagram for the two degrees of freedom vibrating system shown in FIG. 5.

[Motion equation (1)]

$$\begin{bmatrix} \omega_1 \\ \omega_2 \end{bmatrix} = \frac{1}{2} \{\Omega_1^2 + (1+\mu)\Omega_2^2\} \mp \sqrt{\{\Omega_1^2 + (1+\mu)\Omega_2^2\}^2 - 4\Omega_1^2\Omega_2^2} \quad (1)$$

wherein "$\mu$" is defined by $$\frac{m_2}{m_1},$$

"$\Omega_1$" is defined by $$\sqrt{\frac{k_1}{m_1}}$$

and "$\Omega_2$" is defined by $$\sqrt{\frac{k_2}{m_2}}$$

Namely, each of the natural frequencies $\omega_1$ and $\omega_2$ is determined by the above three parameters of "$\mu$", "$\Omega_1$" and "$\Omega_2$".

The amount of electric power generated by the two degrees of freedom vibrating system represented by the motion equation (1) decays due to power generation. As shown in FIG. 6, the amount of the generated electric power maximizes at two resonant frequencies $f_1$ and $f_2$ respectively determined by the two natural frequencies $\omega_1$ and $\omega_2$. Namely, in the power generator 100, the power generating unit 10 can be efficiently vibrated relative to the housing 20 in a broad frequency range between the two resonant frequencies $f_1$ and $f_2$. In a case where the two degrees of freedom vibrating system has no decay, the natural frequencies $\omega_1$ and $\omega_2$ are respectively equal to the resonant frequencies $f_1$ and $f_2$.

By setting the masses ($m_1$ and $m_2$) and the spring constants ($k_1$ and $k_2$) of the vibrating systems so that the first resonant frequency $f_1$ is different from the second resonant frequency $f_2$, that is, reduplication of the resonant frequency is achieved, the generating unit 10 can be efficiently vibrated by the external vibration (that is, vibration applied to the housing 20) having a frequency other than the set resonant frequencies $f_1$ and $f_2$.

For example, in a case where the frequency of the vibrating body is in the range of 20 to 40 Hz, it is preferred that the masses ($m_1$ and $m_2$) and the spring constants ($k_1$ and $k_2$) of the vibrating system are adjusted so as to satisfy the following conditions represented by the following conditional equations (1) to (3). This makes it possible to especially improve power generation efficiency of the power generator 100 with the external vibration of the vibrating body having the above frequency.

$$m_1[kg]:m_2[kg]=1.5:1 \quad (1)$$

$$m_1[kg]:k_1[N/m]=1:60000 \quad (2)$$

$$m_2[kg]:k_2[N/m]=1:22000 \quad (3)$$

In order to set the spring constants ($k_1$ and $k_2$) of the spring portions (the first spring portions 64 and the second spring portions 65) at desired values, an average thickness of each of the leaf spring 60U, 60L may be appropriately adjusted. In this time, the average thickness of each of the leaf springs 60U, 60L is preferably in the range of about 0.1 to 0.4 mm, and more preferably in the range of about 0.2 to 0.3 mm. By setting the average thickness of each of the leaf springs 60U, 60L within the above range, it is possible to reliably prevent plastic deformations, fractures and the like of the leaf springs 60U, 60L. This makes it possible to use the power generator 100 over a long time in a state that the power generator 100 is fixedly attached to the vibrating body.

<<Magnet Assembly 30>>

The magnet assembly 30 having the permanent magnet 31 is supported between the upper leaf spring 60U and the lower leaf spring 60L.

The magnet assembly 30 includes the permanent magnet 31 having a discoid shape (a relatively-thin columnar shape) and a back yoke 32 including a bottom plate 321 having a central portion on which the permanent magnet 31 is disposed and a periphery, a cylindrical portion 322 upwardly extending from the periphery of the bottom plate 321 and a yoke 33 disposed on an upper side of the permanent magnet 31. The magnet assembly 30 is supported between the leaf springs 60U, 60L in a state that the periphery of the bottom plate 321 is coupled with the third circular portion 63 of the lower leaf spring 60L and the yoke 33 is coupled with the third circular portion 63 of the upper leaf spring 60U through the spacer 70 (which is explained below).

The permanent magnet 31 is disposed between the back yoke 32 and the yoke 33 in a state that a north pole of the permanent magnet 31 faces to the yoke 33 and a south pole of the permanent magnet 31 faces to the bottom plate 321 of the back yoke 32. Namely, the magnet assembly 30 is supported between the leaf springs 60U, 60L in a state that the magnet assembly 30 can be displaced in a magnetization direction while the magnet assembly 30 coupled with the coil holding portion 50 through the second spring portions 65 of the leaf springs 60U, 60L is vibrated relative to the coil holding portion 50.

Examples of the permanent magnet 31 include an alnico magnet, a ferrite magnet, a neodymium magnet, a samarium-cobalt magnet, a bonded magnet obtained by molding a compound material constituted of pulverized materials of the above magnets which are mixed with a resin material or a rubber material. The permanent magnet 31 is fixedly supported between the back yoke 32 and the yoke 33, for example, by bonding with an adhesive.

The yoke 33 has a size in the planar view substantially equal to a size of the permanent magnet 31 in the planar view. The yoke 33 has a through-hole formed in a central portion thereof.

The back yoke 32 is configured to position the coil 40 (which is explained below) held by the coil holding portion 50 between the cylindrical portion 322 and the permanent magnet 31 (the yoke 33) without contacting with the cylindrical portion 322 and the permanent magnet 31. Namely, an inner diameter of the cylindrical portion 322 is set to be larger than an outer diameter of the coil 40. In addition, the bottom plate 321 of the back yoke 32 has a through-hole formed in the vicinity of the central portion of the bottom plate 321.

Examples of constituent materials for the back yoke 32 and the yoke 33 include a pure iron (for example, JIS SUY), a soft iron, a carbon iron, a magnetic steel (a silicon steel), a high-speed tool steel, a structural steel (for example, JISS400), a stainless, a permalloy and a combination of two or more the above materials.

<<Coil Holding Portion 50>>

The coil holding portion 50 is located between the magnet assembly 30 and the housing 20. The coil holding portion includes the cylindrical portion 51 having an inner circumferential surface and a ring-shaped member 52 having an opening and provided on the inner circumferential surface of the cylindrical portion 51.

The four threaded holes 511 are formed on both the upper end and the lower end of the cylindrical portion 51, respectively. By screwing the screws 82 into the threaded holes 511 passing through the through-holes 81 of the washers 80 and the through-holes 67 of the second circular portions 62 in the leaf springs 60U, 60L, the cylindrical portion 51 is coupled with the second circular portions 62 of the leaf springs 60U, 60L. The cylindrical portion 51 has four cutouts 512 formed on the upper end thereof.

The ring-shaped member 52 has an outer diameter substantially equal to an inner diameter of the cylindrical portion 51 and four protruding portions 521 formed on an outer periphery of the ring-shaped member 52 so as to outwardly protrude from the outer periphery thereof. By engaging the four protruding portions 521 with the cutouts 512 of the cylindrical portion 51, the ring-shaped member 52 is coupled with the cylindrical portion 51.

An inner diameter of the opening of ring-shaped member 52 is set to be larger than an outer diameter of the aftermentioned spacer 70 (a cylindrical portion 71 of the spacer 70). Such coil holding portion 50 can hold the coil 40 on a lower surface of the ring-shaped member 52.

<<Coil 40>>

The coil 40 is held on the lower surface of the ring-shaped member 52 of the coil holding portion 50 and positioned close to an inner periphery of the opening of ring-shaped member 52. The coil 40 held by the coil holding portion 50 is disposed between the cylindrical portion 322 of the back yoke 32 and the permanent magnet 31 of the magnet assembly 30 without contacting with the cylindrical portion 322 and the permanent magnet 31. The coil 40 can be displaced relative to the permanent magnet 31 in the vertical direction due to the vibration of the power generating unit 10 (the vibrations of the coil holding portion 50 and the magnet assembly 30). In this time, a magnetic flux density passing through the coil 40 caused by the permanent magnet 31 changes, and thus electric voltage is generated in the coil 40.

The coil 40 is formed by winding a wire rod so as to surround the permanent magnet 31 in the assembled state. The wire rod is not limited to a specific type, but examples of the wire rod include a wire rod obtained by covering a copper base line with an insulating film, a wire rod obtained by covering a copper base line with an insulating film having adhesiveness and a combination thereof. The number of turns in the coil 40 is not limited to a specific number and may be appropriately set according to a cross-sectional area of the wire rod and the like.

A cross-sectional shape of the wire rod may be any shape such as a polygonal shape including a triangular shape, a square shape, a rectangle shape and a hexagonal shape; a circular shape and an elliptical shape.

Both ends of the wire rod constituting the coil 40 are connected with an electric voltage output unit 90. The electric voltage generated in the coil 40 is outputted through the electric voltage output unit 90.

The power generator 100 according to this embodiment includes the spacer 70 disposed on an upper surface of the yoke 33. The spacer 70 has a cylindrical portion 71 including a cylindrical shape with a sealed end and a non-sealed end and a circular flange 72 integrally formed along with an outer periphery of the non-sealed end of the cylindrical portion 71. The sealed end of the spacer 70 is disposed on the yoke 33 and an outer periphery of the flange 72 is coupled with the third circular portion 63 of the upper leaf spring 60U. The cylindrical portion 71 of the spacer 70 is located within the opening of the ring-shaped member 52 of the coil holding portion 50 in the assembled state. In the power generator 100 according to this embodiment, by coupling the yoke 33 with the upper leaf spring 60U through the spacer 70, it is possible to keep the circular portions (the first circular portion 61, the second circular portion 62 and the third circular portion 63) of the upper leaf spring 60U to be parallel to each other when the power generating unit 10 is not vibrated. In other words, there is no tension in the spring portions (the first spring portions 64 and the second spring portions 65) when the power generating unit 10 is not vibrated.

Examples of a constituent material for the spacer 70 include magnesium, aluminum and a resin material for molding.

Figure 7:
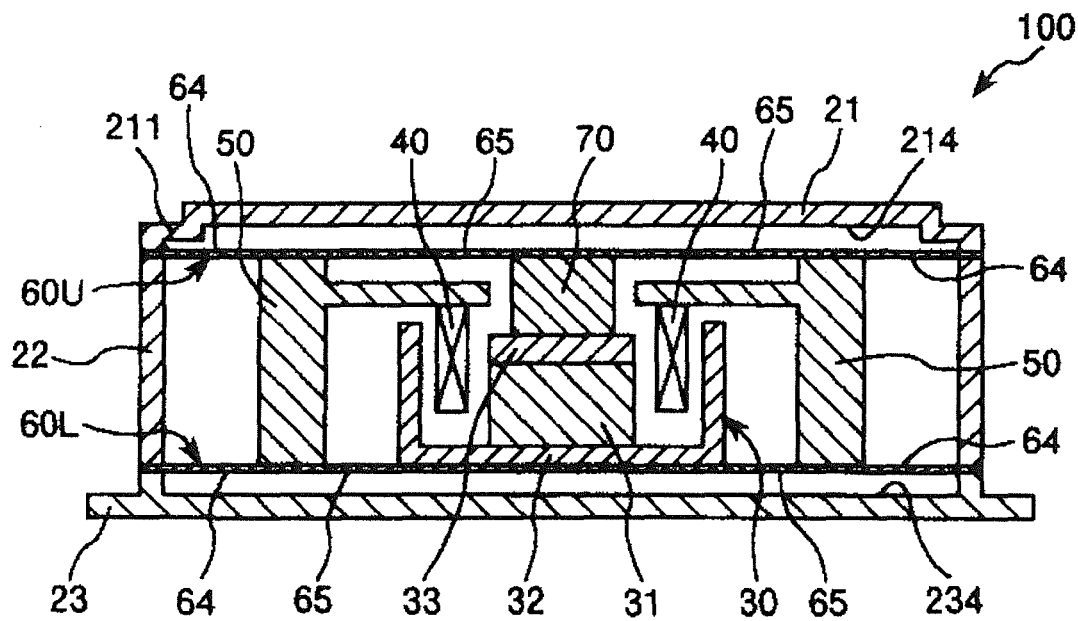
FIG. 7 is a cross-sectional schematic view showing a frame of the power generator shown in FIG. 1.
Figure 8:
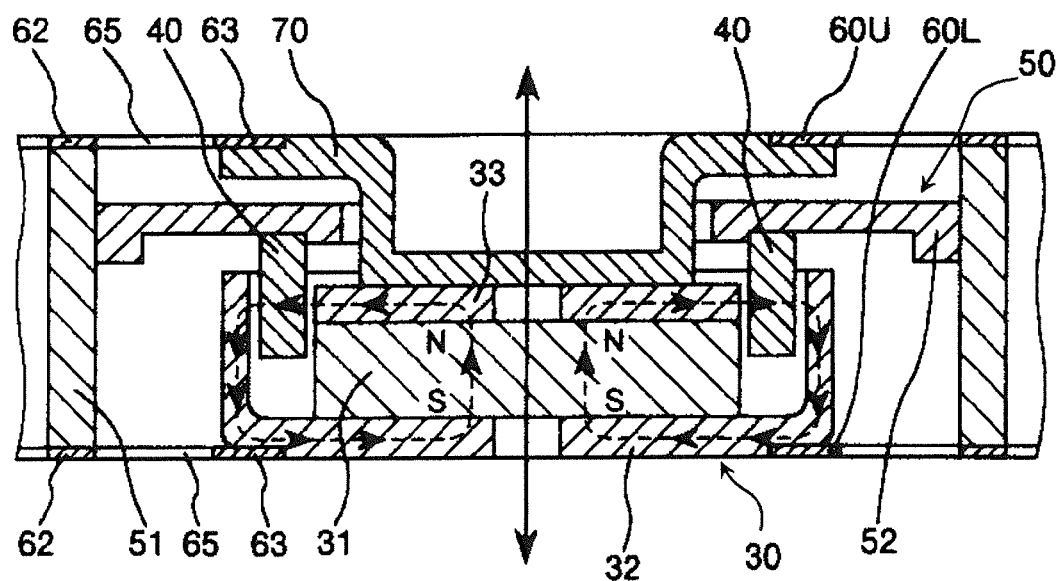
FIG. 8 is a view for explaining a magnetic circuit (a magnetic loop) formed in the power generator shown in FIG. 1.

Next, description will be given to an operation of such power generator 100. FIG. 7 is a cross-sectional schematic view showing a frame of the power generator 100 shown in FIG. 1. FIG. 8 is a view for explaining a magnetic circuit (a magnetic loop) formed in the power generator 100 shown in FIG. 1.

As shown in FIG. 7, in the power generator 100, when the external vibration of the vibrating body is transmitted to the housing 20, the power generating unit 10 is vibrated between the concave portion 214 defined by the cover 21 and the concave portion 234 defined by the base 23. In more details, the coil holding portion 50 coupled with the housing 20 through the first spring portions 64 of the leaf springs 60U, 60L is vibrated relative to the housing 20 between the concave portions 214, 234 in the vertical direction in FIG. 7 (namely, the first vibrating system is vibrated). In the same manner, the magnet assembly 30 coupled with the coil holding portion 50 through the second spring portions 65 of the leaf springs 60U, 60L is vibrated relative to the coil holding portion 50 holding the coil 40 between the concave portions 214, 234 in the vertical direction in FIG. 7 (namely, the second vibrating system is vibrated).

Each of the leaf springs 60U, 60L has a lateral spring constant in a lateral direction perpendicular to the vibrating direction of the spring portions 64, 65 (the vertical direction). The lateral spring constant is structurally larger than the spring constant in the vibrating direction of the spring portions 64, 65. Namely, each of the leaf springs 60U, 60L has a longitudinal stiffness in a thickness direction thereof and a lateral stiffness in the lateral direction larger than the longitudinal stiffness. Thus, each of the leaf springs 60U, 60L is more likely to be distorted or deformed in the thickness direction than the lateral direction.

Further, both ends in the thickness direction of each of the magnet assembly 30 and the coil holding portion 50 holding the coil 40 are coupled with the circular portions (the second circular portions 62 and the third circular portions 63). Further, the circular portions 61, 62, 63 of the leaf springs 60U, 60L are respectively coupled with each other through both the spring portions 64, 65 of the leaf springs 60U, 60L. Thus, each of the magnet assembly 30 and the coil holding portion 50 holding the coil 40 can be vibrated together with the leaf springs 60U, 60L.

For the reasons explained above, it is possible to prevent the magnet assembly 30 and the coil holding portion 50 holding the coil 40 from being vibrated in the lateral direction perpendicular to the thickness direction of the leaf springs 60U, 60L (lateral motion) and being rotated (rolling motion). This makes it possible to restrict a vibrational axis of the magnet assembly 30 and the coil holding portion 50 to a specific direction (the thickness direction of the leaf springs 60U, 60L). As a result, it is possible to prevent the magnet assembly 30 and the coil holding portion 50 holding the coil 40 from contacting with each other while each of the magnet assembly 30 and the coil holding portion 50 holding the coil 40 is vibrated (that is, at the time of generating electric power). In particular, since both the magnet assembly 30 and the coil holding portion 50 holding the coil 40 have high stiffness, both the magnet assembly 30 and the coil holding portion have a high lateral stiffness in the lateral direction perpendicular to the vibrating direction as well as the leaf springs 60U, 60L. Thus, it is possible to reliably prevent the magnet assembly 30 and the coil holding portion 50 holding the coil 40 from contacting with each other.

As explained above, in the power generator 100, since the contact between the magnet assembly 30 and the coil holding portion 50 holding the coil 40 is avoided, it is possible to efficiently transmit vibrational energy of the vibrating body to the first vibrating system and then efficiently transmit vibrational energy of the first vibrating system to the second vibrating system. Namely, the vibrational energy is transmitted from the vibrating body to the first vibrating system and then transmitted to the second vibrating system through the first vibrating system. As a result, the power generator 100 can generate electric power with high efficiency.

Furthermore, as explained above, the first vibrating system has the first natural frequency $\Omega_1$ determined by the mass $m_1$ of the coil holding portion 50 (the coil 40 and the coil holding portion 50), the mass ratio $\mu$ between the coil holding portion 50 and the magnet assembly 30 and the spring constant $k_1$ of the first spring portions 64. On the other hand, the second vibrating system has the second natural frequency $\omega_2$ determined by the mass $m_2$ of the magnet assembly 30, the mass ratio $\mu$ between the coil holding portion 50 and the magnet assembly 30 and the spring constant $k_2$ of the second spring portions 65. Therefore, the power generator 100 can efficiently convert the external vibration in a frequency range between the first resonant frequency $\omega_1$ and the second resonant frequency $\omega_2$ into electric power. In other words, by setting the masses $m_1$, $m_2$ of components and the spring constants $k_1$, $k_2$ of the spring portions 64, 65 of the leaf springs 60U, 60L according to the frequency of the external vibration of the vibrating body, it is possible to efficiently convert the external vibration into electric energy in a broad frequency range.

Further, in the power generator 100, the first vibrating system and the second vibrating system are aligned in the horizontal direction in FIG. 7 and overlapped in the vertical direction in FIG. 7. Thus, it is possible to reduce a height of the power generator 100. As a result, it is possible to install the power generator 100 in a smaller space.

Furthermore, in the power generator 100, the magnet assembly 30 and the coil holding portion 50 respectively constituting the first vibrating system and the second vibrating system are supported between the leaf springs 60U, 60L having the high lateral stiffness. This makes it possible to vertically mount the power generator 100 on the vibrating body (mount the power generator 100 on a side surface of the vibrating body). Even in such case, the vibrational characteristics of the magnet assembly 30 and the coil holding portion 50 supported between the leaf springs 60U, 60L are not changed. Namely, even in a case where the power generator 100 is mounted on the side surface of the vibrating body, the power generator 100 can provide high power generation efficiency as well as the power generator 100 horizontally mounted on the vibrating body (the power generator 100 mounted on an upper surface or a lower surface of the vibrating body).

As explained above, in the power generator 100, the through-holes are formed in the vicinities of the central portions of the yoke 33 and the bottom plate 321 of the back yoke 32 in the magnet assembly 30. As shown in FIG. 8, the magnetic loop due to the permanent magnet 31, the yoke 33 and the back yoke 32 flows from a center to a periphery of the magnet assembly 30 through the yoke 33 and flows from the periphery to the center of the magnet assembly 30 through the back yoke 32. In such structure, a relative displacement between the magnet assembly 30 and the coil 40 is caused while the power generating unit 10 is vibrated. Due to the displacement, a magnetic field having a magnetic flux density B is generated in the magnet assembly 30, and changes of such magnetic flux induce a voltage in the coil 40. Namely, electromotive force is caused due to Lorentz force acting on electrons in the coil 40. The power generator 100 can efficiently generate electric power by using the electromotive force.

Second Embodiment

Next, description will be given to a power generator 100 according to a second embodiment of the present invention.

FIG. 9 is a planar view showing each of leaf springs included in the power generator 100 according to the second embodiment of the present invention. Hereinafter, the power generator 100 according to the second embodiment will be described by placing emphasis on the points differing from the power generator 100 according to the first embodiment, with the same matters omitted from description.

The power generator 100 according to the second embodiment has the same structure as the first embodiment except that the structure of one of the leaf springs 60U, 60L is modified.

In the power generator 100 according to the second embodiment, the lower leaf spring 60L is held between the base 23 and the cylindrical portion 22 of the housing 20 in a state that the lower leaf spring 60L is rotated at 90 degrees in the clockwise direction relative to the upper leaf spring 60U in the planar view.

Figure 9A:
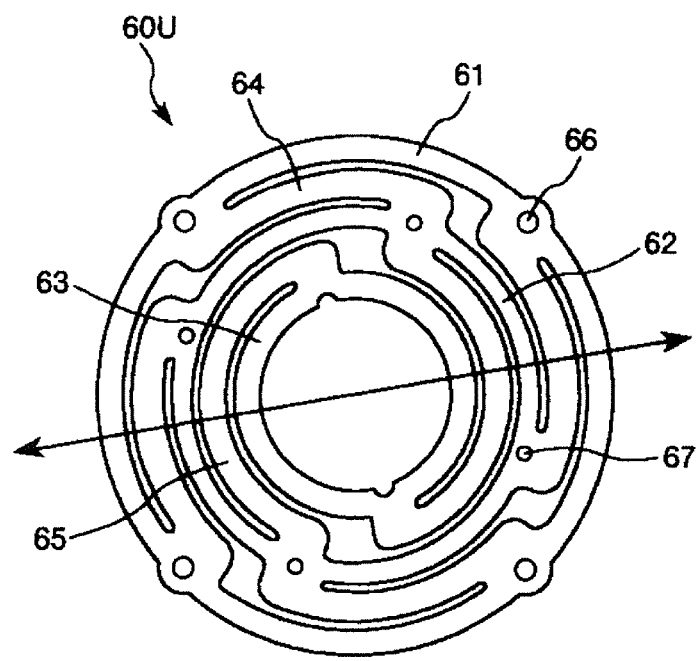
FIGS. 9*a* and 9*b* are planar views showing each of leaf springs included in a power generator according to a second embodiment of the present invention.
Figure 9B:
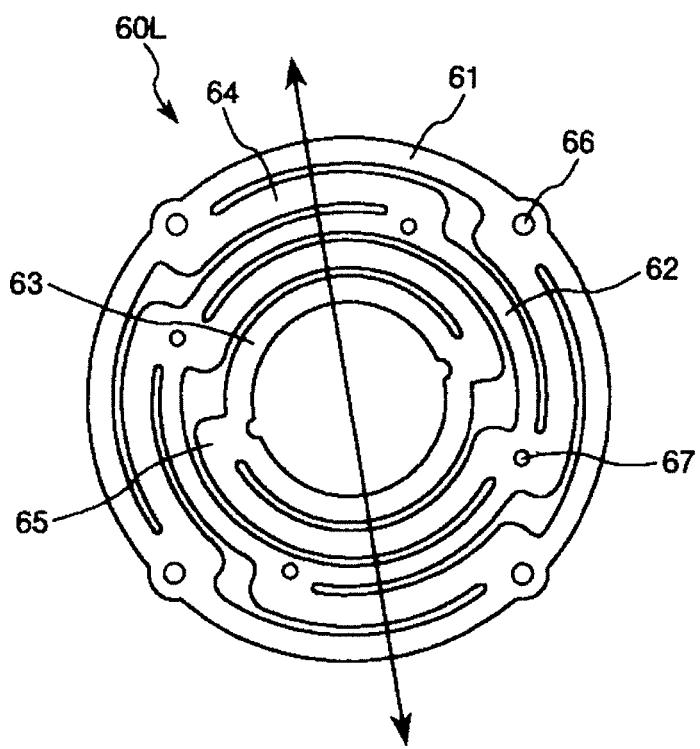

As shown in FIG. 9b, in the power generator 100 according to this embodiment, the pair of the second spring portions 65 in the lower leaf spring 60L is disposed so as to be rotated at 90 degrees in the clockwise direction (or the counterclockwise direction) relative to the pair of the second spring portions 65 in the upper leaf spring 60U in the planar view.

In the upper leaf spring 60U, the first spring portions 64 and the second spring portions 65 have no coupled point which couples the spring portions 64, 65 with the circular portions 61, 62 (the first circular portion 61 and the second circular portion 62) in an A-A direction in FIG. 9a. Therefore, the lateral stiffness of the upper leaf spring 60U in the A-A direction is smaller than in other directions.

On the other hand, since the lower leaf spring 60L is disposed so as to be rotated at 90 degrees in the clockwise direction relative to the upper leaf spring 60U, the lateral stiffness of the lower leaf spring 60L in a B-B direction in FIG. 9b perpendicular to the A-A direction is smaller than in the other direction.

In the power generator 100 according to this embodiment, the upper leaf spring 60U and the lower leaf spring 60L are disposed so that the A-A direction of the upper leaf spring 60U (the direction in which the lateral stiffness of the upper leaf spring 60U is small) and the B-B direction of the lower leaf spring 60L (the direction in which the lateral stiffness of the lower leaf spring 60L is small) are perpendicular to each other. This makes it possible to mutually compensate for each of the directions in which the lateral stiffness of each of the leaf springs 60U, 60L is small. As a result, it is possible to reliably prevent the leaf springs 60U, 60L (the power generating unit 10) from undesirably resonating in the horizontal direction (the lateral direction) perpendicular to the vibrating direction of the spring portions (the vertical direction) due to the external vibration of the vibrating body. By preventing such undesired resonance, it is possible to more improve the power generation efficiency of the power generator 100.

In the above explanation, description is given to the case shown in FIG. 9b where the lower leaf spring 60L is disposed so as to be rotated at 90 degrees in the clockwise direction relative to the upper leaf spring 60U, but the present invention is not limited thereto. The lower leaf spring 60L may be rotated any angles relative to the upper leaf spring 60U, as long as the direction in which the lateral stiffness of the upper leaf spring 60U is small is not aligned with the direction in which the lateral stiffness of the lower leaf spring 60L is small. In such cases, the power generator 100 can provide the above effect that prevents the leaf springs 60U, 60L (the power generating unit 10) from undesirably resonating in the horizontal direction.

Example of a method for preventing the undesired resonance other than the above explained method include a method in which the leaf springs 60U, 60L having structures differing from each other are used in the power generator 100. In particular, this method is performed by setting at least one selected from the group consisting of the thickness, the constitutional material, the number of the first spring portions 64 and the number of the second spring portions 65 of one of the leaf spring 60U, 60L to be different from the one of the other of the leaf springs 60U, 60L.

By changing the above parameter of one of the leaf springs 60U, 60L, it is possible to set the first spring constant $k_1$ of the first spring portions 64 and the second spring constant $k_2$ of the second spring portion 65 of the one of the leaf springs 60U, 60L to be different from those of the other of the leaf springs 60U, 60L.

Regarding the vibrating direction (the vertical direction), since the leaf springs 60U, 60L are coupled with each other through the cylindrical portion 51 of the coil holding portion 50, the spacer 70 and the magnet assembly 30, the first spring constant $k_1$ of the first spring portions 64 as a whole can be considered as an added value (composite value) of the first spring constants $k_1$ of the first spring portions 64 of the leaf springs 60U, 60L. In the same manner, the second spring constant $k_2$ of the second spring portions 65 as a whole can be considered as an added value (composite value) of the second spring constants $k_2$ of the second spring portions 65 of the leaf springs 60U, 60L. Thus, even in a case where the above parameters of one of the leaf springs 60U, 60L are changed, there is no influence on the first vibrating system and the second vibrating system.

On the other hand, regarding the horizontal direction (the lateral direction) perpendicular to the vibrating direction, a horizontal resonant frequency due to the spring portions (the first spring portions 64 and the second spring portion 65) of the upper leaf spring 60U is different from a horizontal resonant frequency due to the spring portions (the first spring portions 64 and the second spring portion 65) of the lower leaf spring 60L in the horizontal direction. Thus, even in a case where the external vibration having a horizontal frequency equal to the horizontal resonant frequency of the upper leaf spring 60U is transmitted to the housing 20, the lower leaf spring 60L is not resonated because the horizontal resonant frequency of the lower leaf spring 60L is different from the horizontal resonant frequency of the upper leaf spring 60U. This makes it possible to reduce the undesired resonance of the spring portions in the horizontal direction as a whole of the power generator 100. As a result, it is possible to more improve the power generation efficiency of the power generator 100.

The power generator 100 according to the second embodiment can also provide the same effect as the power generator 100 of the first embodiment.

Third Embodiment

Next, description will be given to a power generator 100 according to a third embodiment of the present invention.

Figure 10:
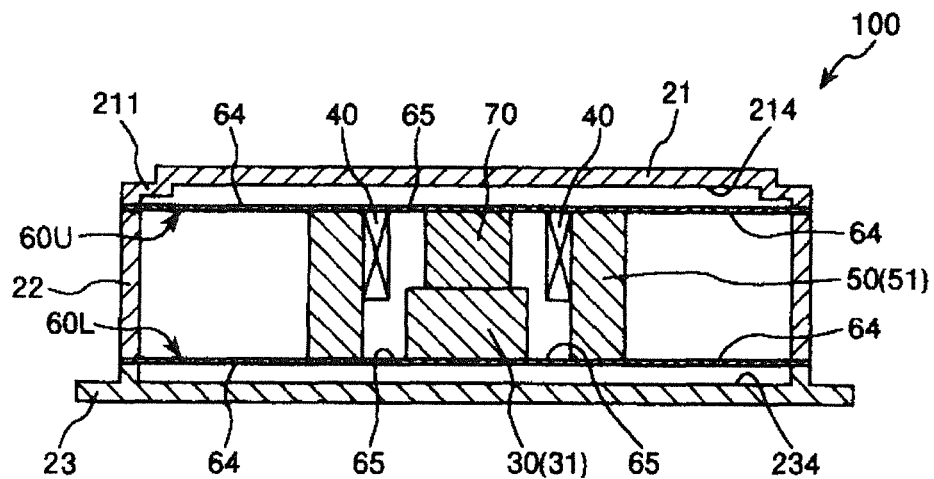
FIG. 10 is a cross-sectional schematic view showing a power generator according to a third embodiment of the present invention.

FIG. 10 is a cross-sectional schematic view showing the power generator 100 according to the third embodiment of the present invention. Hereinafter, an upper side in FIG. 10 is referred to as "upper" or "upper side" and a lower side in FIG. 10 is referred to as "lower" or "lower side".

Hereinafter, the power generator 100 according to the third embodiment will be described by placing emphasis on the points differing from the power generators 100 according to the first embodiment and the second embodiment, with the same matters omitted from description.

The power generator 100 according to the third embodiment has the same structure as the first embodiment except that the structures of the magnet assembly 30 and the coil holding portion 50 are modified.

<<Magnet Assembly 30>>

As shown in FIG. 10, the magnet assembly 30 is constituted of only the permanent magnet 31. A lower side of the permanent magnet 31 is coupled with the third circular portion 63 of the lower leaf spring 60L and the upper side of the permanent magnet 31 is coupled with the third circular portion 63 of the upper leaf spring 60U through the spacer 70.

<<Coil Holding Portion 50 and Coil 40>>

The coil 40 is held on the inner circumferential surface of the cylindrical portion 51 and positioned close to the upper end of the cylindrical portion 51. In the same manner as the cylindrical portion 51 of the first embodiment, the four threaded holes 511 are formed on both the upper end and the lower end of the cylindrical portion 51, respectively. The cylindrical portion 51 is coupled with the second circular portions 62 of the leaf springs 60U, 60L by screwing the screws 82 into the threaded holes 511. Namely, the coil holding portion 50 is supported between the second circular portions 62 of the leaf springs 60U, 60L.

The power generator 100 according to the third embodiment can also provide the same effect as that of the power generators 100 of the first embodiment and the second embodiment.

As shown in FIG. 10, in the power generator 100 according to this embodiment, the magnet assembly 30 is constituted of only the permanent magnet 31 and the coil holding portion 50 is constituted of only the cylindrical portion 51. Thus, in the power generator 100 according to the third embodiment, the number of components is less than the power generator 100 according to the first embodiment. Therefore, it is possible to reduce manufacturing costs.

Fourth Embodiment

Next, description will be given to a power generator 100 according to a fourth embodiment of the present invention.

Figure 11:
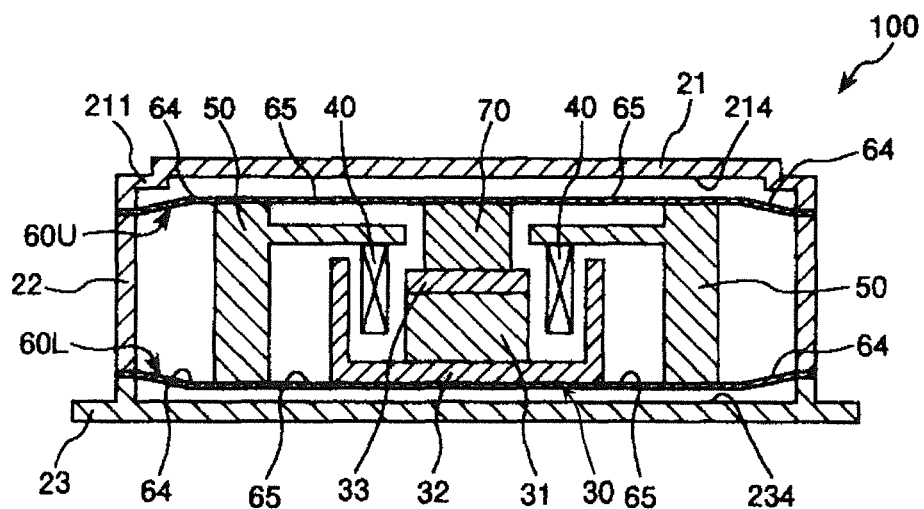
FIG. 11 is a cross-sectional schematic view showing a first constructive example of a power generator according to a fourth embodiment of the present invention.
Figure 12:
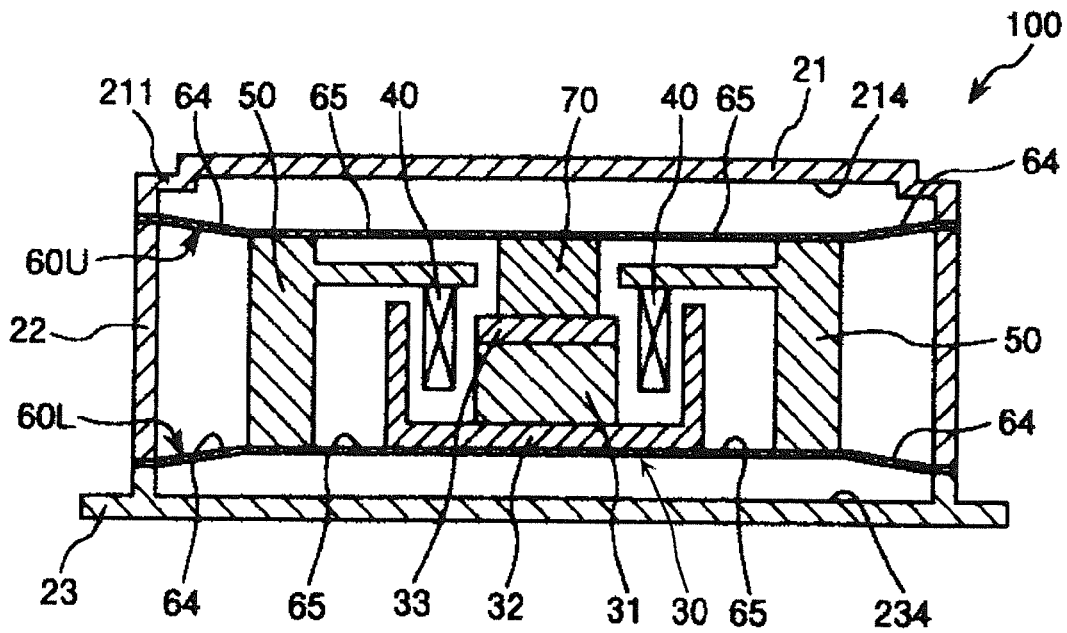
FIG. 12 is a cross-sectional schematic view showing a second constructive example of the power generator according to the fourth embodiment of the present invention.
Figure 13:
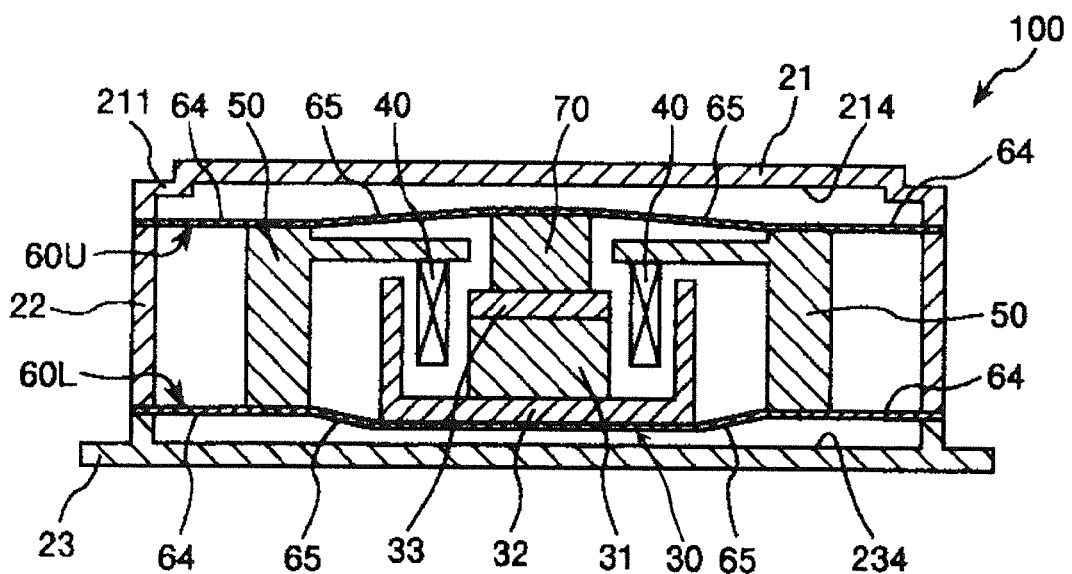
FIG. 13 is a cross-sectional schematic view showing a third constructive example of the power generator according to the fourth embodiment of the present invention.
Figure 14:
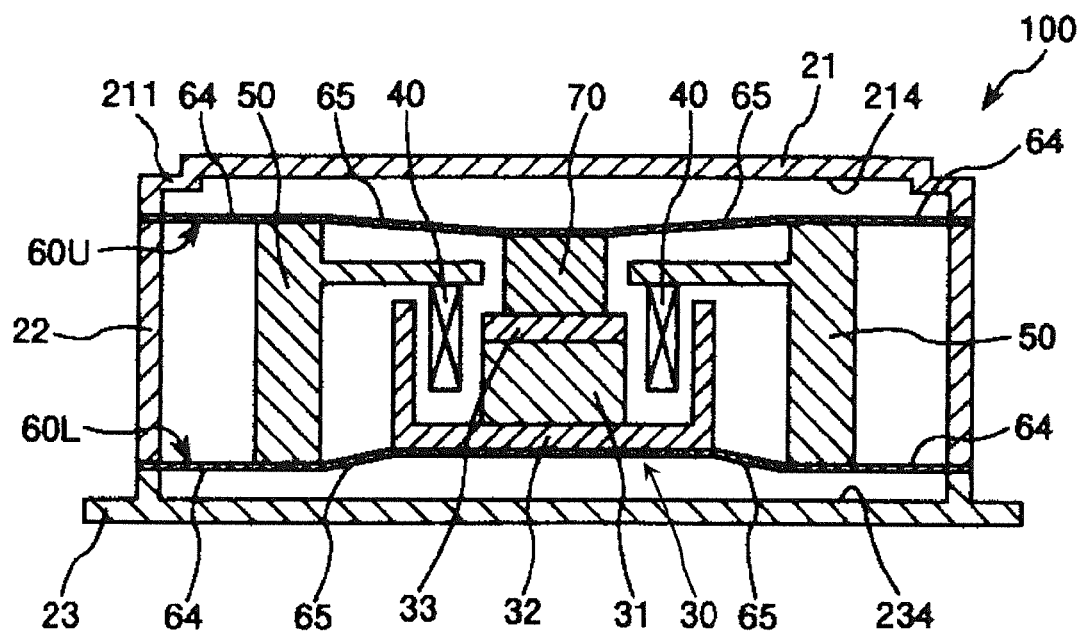
FIG. 14 is a cross-sectional schematic view showing a fourth constructive example of the power generator according to the fourth embodiment of the present invention.
Figure 15:
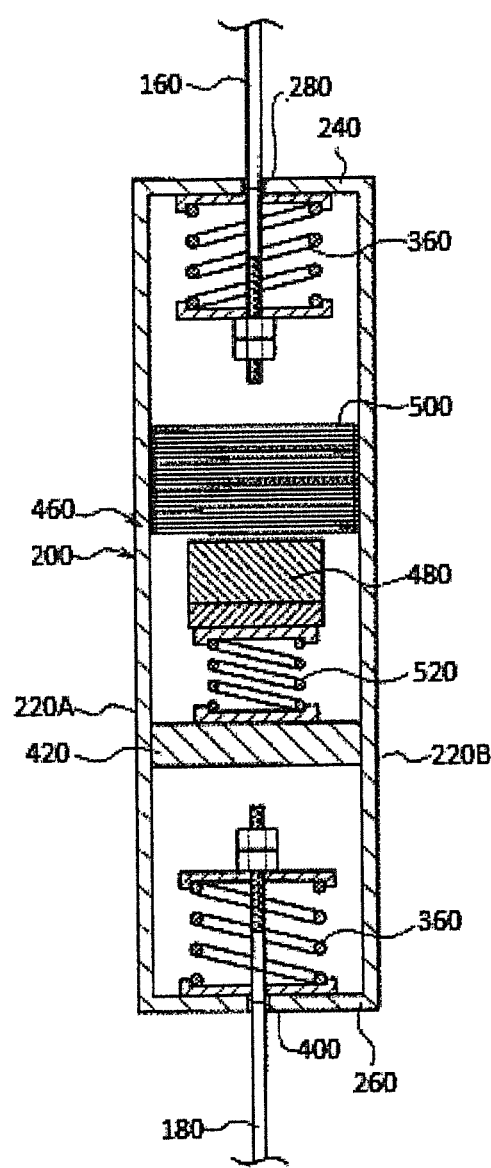
FIG. 15 is a main part cross-sectional view showing a power generator of the prior art.

FIG. 11 is a cross-sectional schematic view showing a first constructive example of the power generator 100 according to the fourth embodiment of the present invention. FIGS. 12 to 14 are cross-sectional schematic views showing other constructive examples of the power generator 100 according to the fourth embodiment of the present invention.

Hereinafter, each of upper sides in FIGS. 11 and 14 is referred to as "upper" or "upper side" and each of lower sides in FIGS. 11 to 14 is referred to as "lower" or "lower side".

Hereinafter, the power generator 100 according to the fourth embodiment will be described by placing emphasis on the points differing from the power generators 100 according to the first embodiment, the second embodiment and the third embodiment, with the same matters omitted from description.

The power generator 100 according to the fourth embodiment has the same structure as the first embodiment except that a clearance between the leaf springs 60U, 60L varies in a part of the power generator 100.

As shown in FIG. 11, the power generator 100 according to the fourth embodiment is configured to allow a clearance between the first spring portions 64 of the upper leaf spring 60U and the first spring portions 64 of the lower leaf spring 60L to gradually decrease from one side close to the cylindrical portion 22 of the housing 20 to another side close to the coil holding portion 50. Such structure can be achieved by decreasing a height of the cylindrical portion 22 and increasing heights of the lib 211 formed around the outer edge of the cover 21 and the lib 231 formed on the upper surface of the base 23. Due to the structure, the first spring portions 64 disposed between the first circular portions 61 and the second circular portions 62 in the leaf springs 60U, 60L are being distorted. In this regard, it is to be noted that the first spring portions 64 disposed between the circular portions 61, 62 in the leaf springs 60U, 60L are kept flat when the first spring portions 64 are not assembled.

In the power generator 100 having the above structure (the first constructive example), the first spring portions 64 of the leaf springs 60U, 60L are distorted in the vertical direction (the upper side or the lower side in FIG. 11) even when the power generating unit 10 is not vibrated. Thus, the coil holding portion 50 (the power generating unit 10) is biased with pre-tensions in the vertical direction (the upper side and the lower side in FIG. 11) by the first spring portions 64 of the leaf springs 60U, 60L. In such structure, postural changes of the power generating unit 10 caused at the time of horizontally or vertically mounting the power generator 100 on the vibrating body are suppressed. Thus, it is possible to reliably hold the power generating unit 10 in the housing 20. Therefore, even in the case where the power generator 100 is vertically mounted on the vibrating body, the power generator 100 vertically mounted on the vibrating body can reliably provide high power generation efficiency in the same manner as the power generator 100 horizontally mounted on the vibrating body.

In addition, as shown in FIG. 12, the power generator 100 according to the this embodiment may be configured to allow the clearance between the first spring portions 64 of the upper leaf spring 60U and the first spring portions 64 of the lower leaf spring 60L to gradually decrease from the one side close to the cylindrical portion 22 of the housing 20 to the other side close to the coil holding portion 50. Such structure can be constituted by setting the height of the cylindrical portion 22 to be higher than a height of the coil holding portion 50 (the cylindrical portion 51). In the power generator 100 having the above structure (the second constructive example), the coil holding portion 50 (the power generating unit 10) is biased with the pre-tensions in the vertical direction (the upper side and the lower side in FIG. 12) by the first spring portions 64 in the same manner as the first constructive example. Thus, the power generator 100 having the second constructive example can also provide the same effect as that of the power generators 100 of the first constructive example.

In addition, as shown in FIG. 13, the power generator 100 according to the this embodiment may be configured to allow a clearance between the second spring portions 65 of the upper leaf spring 60U and the second spring portions 65 of the lower leaf spring 60L to gradually increase from one side close to the coil holding portion 50 to another side close to the magnet assembly 30 (the spacer 70). Such structure can be achieved by making a height of the spacer 70 higher than a height of the coil holding portion 50 (the cylindrical portion 51).

In the power generator 100 having the above structure (the third constructive example), the second spring portions 65 of the leaf springs 60U, 60L are distorted in the vertical direction (the upper side or the lower side in FIG. 13) even when the power generating unit 10 is not vibrated. Thus, the coil holding portion 50 (the power generating unit 10) is biased with pre-tensions in the vertical direction (the upper side and the lower side in FIG. 13) by the second spring portions 65 of the leaf springs 60U, 60L. In such structure, the postural changes of the power generating unit 10 caused at the time of horizontally or vertically mounting the power generator 100 on the vibrating body are suppressed. Thus, it is possible to reliably hold the power generating unit 10 in the housing 20. Therefore, even in the case where the power generator 100 is vertically mounted on the vibrating unit, the power generator 100 vertically mounted on the vibrating unit can reliably provide high power generation efficiency in the same manner as the power generator 100 horizontally mounted on the vibrating body.

In addition, as shown in FIG. 14, the power generator 100 according to the this embodiment may be configured to allow the clearance between the second spring portions 65 of the upper leaf spring 60U and the second spring portions 65 of the lower leaf spring 60L to gradually decrease from the one side close to the coil holding portion 50 to the other side close to the magnet assembly 30 (the spacer 70). Such structure can be constituted by making the height of the spacer 70 lower. In the power generator 100 having the above structure (the fourth constructive example), the coil holding portion 50 (the power generating unit 10) is biased with pre-tensions in the vertical direction (the upper side and the lower side in FIG. 14) by the second spring portions 65 in the same manner as the third constructive example. Thus, the power generator 100 having the fourth constructive example can also provide the same effect as that of the power generators 100 having the third constructive example.

Although the power generator of the present invention has been described with reference to the accompanying drawings, the present invention is not limited thereto. In the power generator, the configuration of each component may possibly be replaced by other arbitrary configurations having equivalent functions. It may also be possible to add other optional components to the present invention. For example, it may also be possible to combine the configurations according to the first embodiment to the fourth embodiment of the present invention in an appropriate manner.

What is claimed is:

1. A power generator comprising:
   a housing;
   a magnet disposed in the housing in a state that the magnet can be displaced in a magnetization direction thereof;
   a coil disposed in the housing so as to surround the magnet without contacting with the magnet;
   a coil holding portion disposed between the magnet and the housing, the coil holding portion holding the coil in a state that the coil can be displaced relative to the magnet in the magnetization direction of the magnet; and
   a pair of leaf springs disposed in the housing so as to be opposed to each other through at least the magnet, the coil and the coil holding portion;
   wherein each of the leaf springs has first spring portions coupling the housing with the coil holding portion and second spring portions coupling the coil holding portion with the magnet,
   wherein each of the leaf springs includes:
   a first circular portion;
   a second circular portion arranged at an inner side of the first circular portion concentrically with the first circular portion and coupled with the first circular portion through the first spring portions; and
   a third circular portion arranged at an inner side of the second circular portion concentrically with the second circular portion and coupled with the second circular portion through the second spring portions; and
   wherein the housing holds the first circular portions of the leaf springs, the coil holding portion is supported between the second circular portions of the leaf springs, and the magnet is supported between the third circular portions of the leaf springs.

2. The power generator claimed in claim 1, wherein each of the first spring portions of the leaf springs has an arch-shaped portion extending along with a circumferential direction of the first circular portion and the second circular portion so as to couple the first circular portion with the second circular portion.

3. The power generator claimed in claim 1, wherein each of the second spring portions of the leaf springs has an arch-shaped portion extending along with a circumferential direction of the second circular portion and the third circular portion so as to couple the second circular portion with the third circular portion.

4. The power generator claimed in claim 1, wherein each of the leaf springs has a rotationally symmetrical shape around a central axis thereof.

5. The power generator claimed in claim 1, wherein the number of the first spring portions is different from the number of the second spring portions.

6. The power generator claimed in claim 1, wherein at least one selected from the group consisting of a thickness, a constitutional material, the number of the first spring portions and the number of the second spring portions of one of the leaf springs is different from the one of the other of the leaf springs.

7. The power generator claimed in claim 1, wherein a clearance between the first spring portions of one of the leaf springs and the first spring portions of the other of the leaf springs varies from one side close to the housing to another side close to the coil holding portion.

8. The power generator claimed in claim 1, wherein a clearance between the second spring portions of one of the leaf springs and the second spring portions of the other of the leaf springs varies from one side close to the coil holding portion to another side close to the magnet.

9. The power generator claimed in claim 1, wherein the leaf springs have a shape substantially identical to each other, and wherein the leaf springs are arranged so as not to completely overlap the first spring portions of one of the leaf springs with the first spring portions of the other of the leaf springs and/or the second spring portions of one of the leaf springs with the second spring portions of the other of the leaf springs in a planar view of the power generator.

* * * * *